(12) United States Patent
Haudenschild

(10) Patent No.: US 7,927,082 B2
(45) Date of Patent: Apr. 19, 2011

(54) HIGHLY EFFICIENT DURABLE FLUID PUMP AND METHOD

(75) Inventor: Chris Haudenschild, La Jolla, CA (US)

(73) Assignee: GTH Water Systems, Inc., La Jolla, CA (US)

( * ) Notice: Subject to any disclaimer, the term of this patent is extended or adjusted under 35 U.S.C. 154(b) by 639 days.

(21) Appl. No.: 11/295,128

(22) Filed: Dec. 5, 2005

(65) Prior Publication Data
US 2007/0128056 A1 Jun. 7, 2007

(51) Int. Cl.
F04B 9/02 (2006.01)
F04B 7/00 (2006.01)

(52) U.S. Cl. .......... 417/539; 417/53; 417/271; 417/415; 210/134

(58) Field of Classification Search .......... 210/134; 417/53, 221, 271, 415, 449, 539, 269, 529; 222/132
See application file for complete search history.

(56) References Cited

U.S. PATENT DOCUMENTS

| | | | | |
|---|---|---|---|---|
| 3,459,056 A | * | 8/1969 | Lea | 74/32 |
| 3,825,122 A | | 7/1974 | Taylor | |
| 4,145,844 A | | 3/1979 | Kaspar | |
| 4,302,163 A | * | 11/1981 | Hope et al. | 417/473 |
| 4,304,533 A | * | 12/1981 | Buckell | 417/539 |
| 4,434,056 A | * | 2/1984 | Keefer | 210/637 |
| RE32,144 E | * | 5/1986 | Keefer | 210/637 |
| 4,595,495 A | * | 6/1986 | Yotam et al. | 210/101 |
| 4,687,426 A | * | 8/1987 | Yoshimura | 417/539 |
| 5,109,814 A | | 5/1992 | Coates | |
| 5,589,066 A | * | 12/1996 | Gray | 210/258 |
| 5,755,561 A | * | 5/1998 | Couillard et al. | 417/246 |
| 5,852,231 A | * | 12/1998 | Kaji | 73/61.56 |
| 5,993,174 A | * | 11/1999 | Konishi | 417/413.1 |
| 6,017,200 A | * | 1/2000 | Childs et al. | 417/404 |
| 6,470,683 B1 | * | 10/2002 | Childs et al. | 60/641.8 |
| 6,579,451 B1 | * | 6/2003 | Avero | 210/195.2 |
| 6,841,076 B1 | * | 1/2005 | Wobben | 210/652 |
| 2004/0151594 A1 | * | 8/2004 | Allington et al. | 417/12 |

OTHER PUBLICATIONS

Wikipedia, Epicycloid, http://en.wikipedia.org/wiki/Epicycloid (as of May 2, 2009, 00:21 GMT).*

* cited by examiner

Primary Examiner — Devon C Kramer
Assistant Examiner — Leonard J Weinstein
(74) Attorney, Agent, or Firm — Bernard L. Kleinke; Duckor Spradling Metzger & Wynne

(57) ABSTRACT

A highly efficient fluid pump and pumping method are disclosed. The pump includes a cylinder, a piston in the cylinder defining a first and second volume in the cylinder, and a motive actuator for driving reciprocatively a rod attached to the piston at a rate of substantially $\sin^m x$ for $x=0$ to $\pi$, where m is a number greater than one, during a power stroke of that piston.

38 Claims, 7 Drawing Sheets

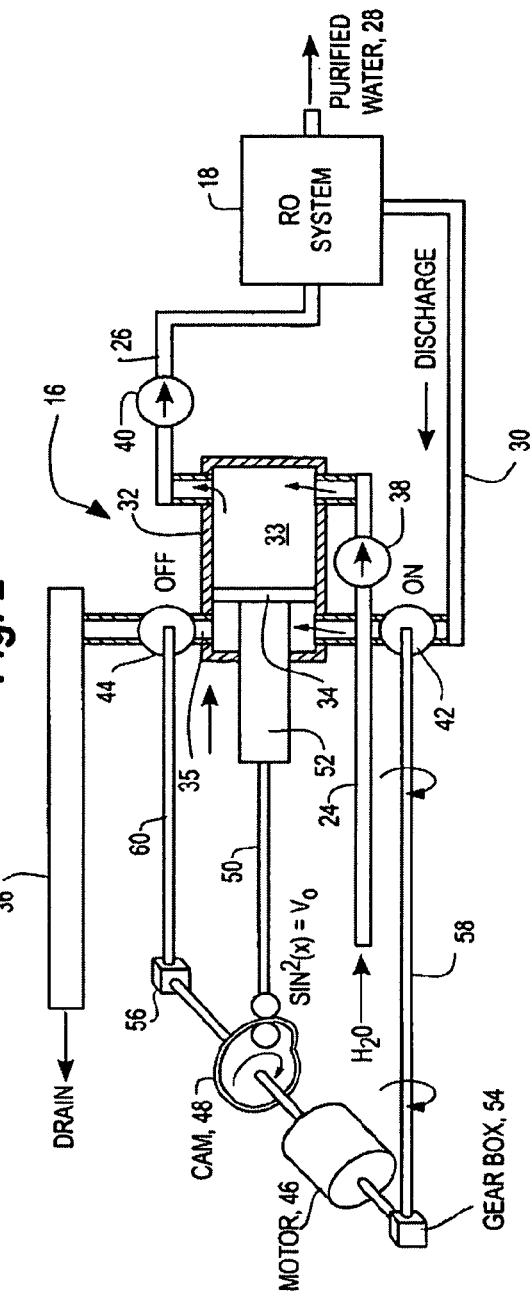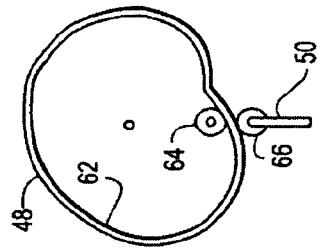

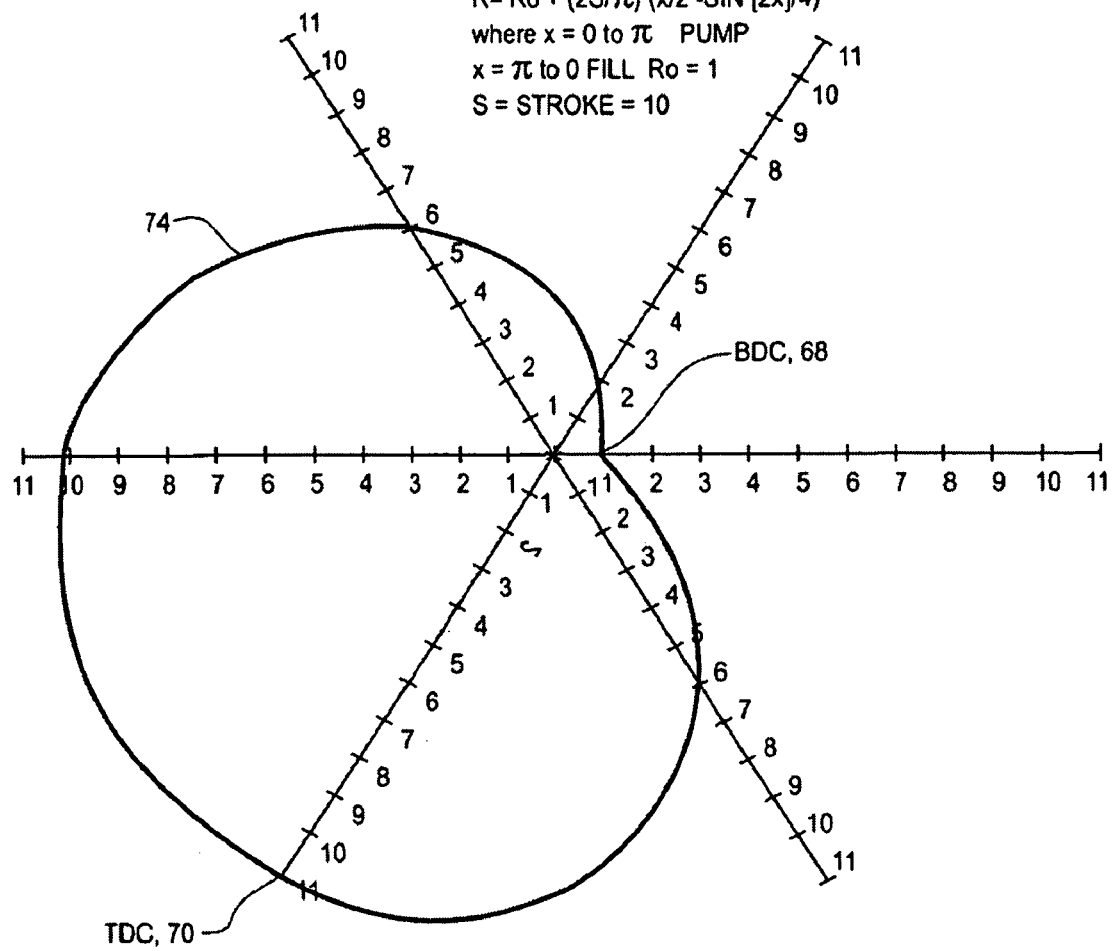

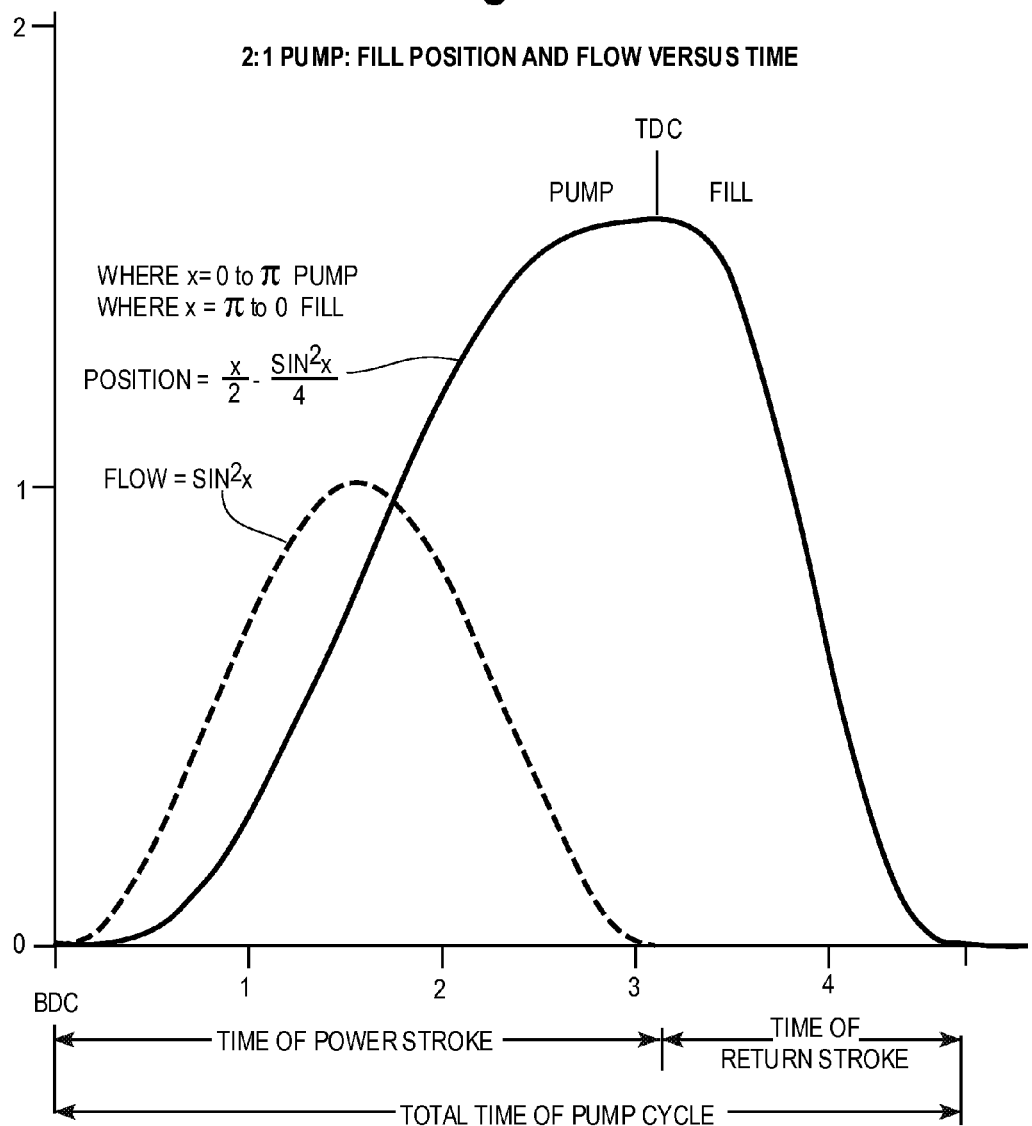

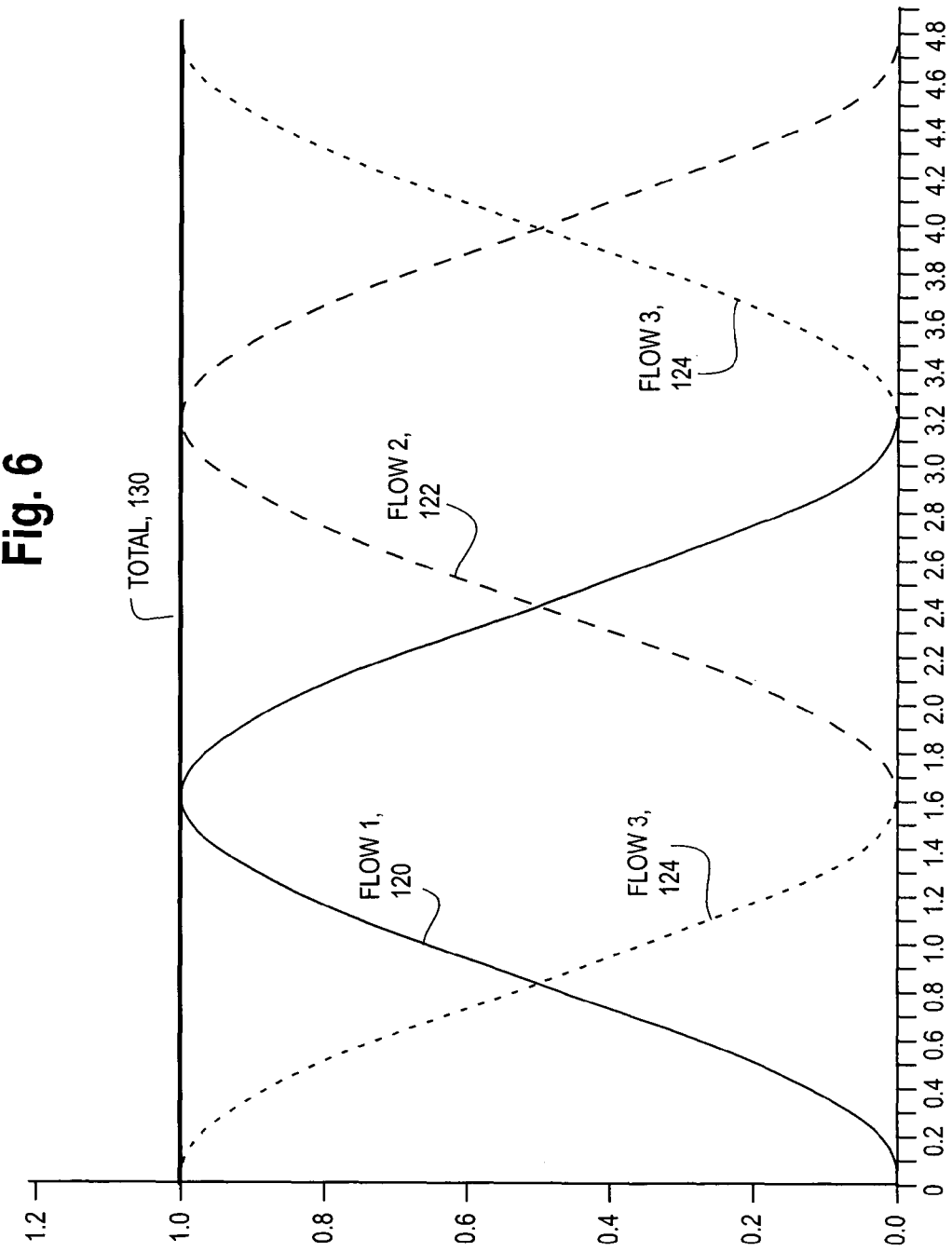

$W = \pi \text{ To}/2$ (RADIANS)
WHERE To = FRACTION OPENED (ANY FLOW)
$W = 2\pi/6$ FOR ENERGY RECOVERY VALVE (ERV)
$W = \pi/6$ FOR FLUID DISCHARGE VALVE (FDV)
FOR 2:1 PUMP:FILL ERV To = 2/3, FDV To = 1/3

HIGHLY EFFICIENT DURABLE FLUID PUMP AND METHOD

RELATED APPLICATION

BACKGROUND OF THE INVENTION

1. Field of the Invention

The present invention relates in general to fluid pumps. It more particularly relates to a highly efficient durable fluid pump and method for a variety of applications, including, but not limited to a desalination system and method.

2. Background Art

There is no admission that the background art disclosed in this section legally constitutes prior art.

There have been a variety of pumping systems employing various components and valves, used for many different applications such as reverse osmosis (RO) pumping systems, hydraulic fluid pumping systems and many others. For example, reference may be made to U.S. Pat. Nos. 3,825,122; 4,145,844; 5,109,814 and 6,017,200.

Typical positive displacement pumps may have problems for certain applications associated with pulsating flow, violent valve action, noise, and vibration. All of the above problems may result in inconsistent flow rates, which in turn, may reduce the efficiency and durability of the pumps and their associated equipment.

Pumping systems may also be used to provide an input stream of fluid to be purified through a membrane or filter, such as a reverse osmosis (RO) membrane, at high pressure. A stream of brine or other unpurified material is then discharged under pressure from such membrane or filter. Such systems may recover energy from the discharge stream, while it is still under pressure and use the recovered energy to assist the operation of the pump to help improve the efficiency of the operation.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein:

FIG. 2 is a diagrammatic view of an embodiment of the combination pump and RO device of the system of FIG. 1;

FIG. 3 is a diagram of an embodiment of a cam and connection to the piston shaft of FIG. 2;

FIG. 4 is a chart diagram of movement of the cam follower of FIG. 3;

FIG. 5 is a graph of the velocity and position of the piston of FIG. 2;

FIG. 6 is a graph of the flow from a pump of FIG. 2 utilizing three cylinders in parallel;

DESCRIPTION OF CERTAIN EMBODIMENTS OF THE INVENTION

Figure 1:
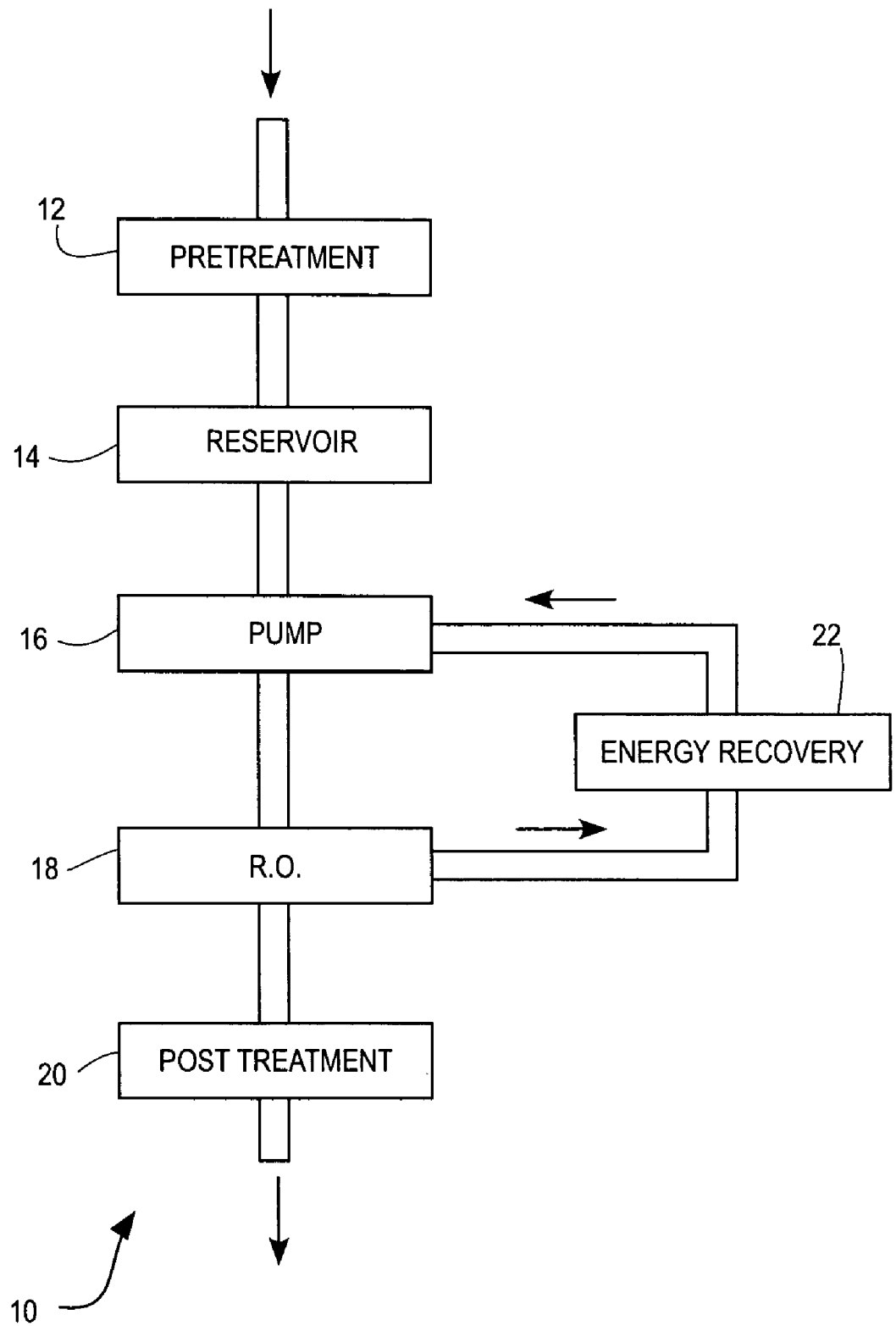
FIG. 1 is a block diagram of an embodiment of the present invention having a desalination system including a pump using energy recovery and an RO device.

It will be readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of the embodiments of the invention.

According to one embodiment of the present invention, there is provided a pump. The pump includes at least one cylinder assembly having a piston in a cylinder defining a first and second volume in the cylinder, a motive actuator such as a motor for driving the piston reciprocatively, and a rod attached to the piston and driven by the motive actuator at a rate of $\sin^m x$ for $x=0$ to $\pi$ during a power stroke of that piston where m is a number greater than one and x is the angular position of a fixed point on a transmission, such as on a cam, attaching the rod to the motive actuator.

In accordance with another disclosed embodiment of the invention, there is provided a pumping system. The pumping system may include at least three cylinders, a piston in each of the cylinders defining a first and second volume in each cylinder, a motive actuator such as one or more motors, a plurality of rods with each rod attached to one of the pistons and driven by the actuator at a rate of $\sin^m x$ for $x=0$ to $\pi$, where m is a number greater than one, during a power stroke of that piston, a treatment device such as a chemical or physical processor or other such device or system, that receives a first fluid under pressure and outputs a second fluid, and first and second valves for each of the cylinders, each first valve controlling the flow of the second fluid into the second volume of the cylinder to assist the actuator in moving the piston, each second valve controlling the flow of the second fluid out of the second volume of the cylinder.

According to another aspect of a disclosed embodiment of the invention, there is provided a desalination system. The desalination system may include a pretreatment unit, a reservoir for holding fluid from the pretreatment unit, a pump receiving the fluid from the reservoir and including at least three cylinders having pistons driven by a motive actuator such as one or more motors at a velocity of $\sin^m x$, where m is a number greater than one, during a power stroke of the pistons, a reverse osmosis device receiving the output fluid flow from the pump and generating a desired product and a discharge, where the discharge is provided to the pump for energy recovery, and a post-treatment unit receiving the desired product from the reverse osmosis device and preparing the desired product for distribution.

Referring to FIG. 1, an embodiment of the present invention as a desalination system for seawater or other salt water is shown. The desalination system 10 may include a pretreatment system 12, a reservoir 14, a pump 16, a reverse osmosis (RO) system 18, and a post-treatment system 20. An energy recovery system 22 may use a bi-product of the RO system 18 to assist the pump 16.

The pretreatment system 12 may include filtration and chemical processing to remove solids from the water and prevent salt precipitation and bacterial growth from occurring on the membranes of the RO system 18. The reservoir 14 may provide a holding area for the pretreated water. The pump 16 may provide the pressure necessary to push the water through the membrane (not shown) of the RO system 18. The RO system 18 may include a pressure vessel (not shown) with a membrane that rejects the passage of salts through it. The post-treatment 20 may include the stabilization of the water by making it less acidic and the preparation of the water for distribution.

Referring now to FIG. 2, an embodiment of the pump 16 with the RO system 18 is shown. The pretreated water may be provided to the pump 16 via line 24. The pump 16 may provide pressurized water via line 26 to the RO system 18, which outputs the desired product, such as desalinated water, through line 28 and provides the pressurized bi-product, such as brine, to the pump 16 via line 30 for power assistance.

The pump 16 may include a cylinder 32 with a piston 34 located therein and a drain 36. The piston 34 may define within the cylinder 32 a first volume 33 and a second volume 35. The first volume 33 may be used to pressurize the fluid from the reservoir 14 prior to its passage to the RO system 18. The second volume 35 may utilize the pressurized bi-product from the RO system 18 to assist the movement of the piston 34 when pressurizing the fluid in the first volume 33.

Check valves 38 and 40 may be inserted in lines 24 and 26, respectively. The check valve 38 may allow the flow of fluid from the reservoir 14 to the pump 16 and may restrict the flow of fluid from the pump 16 to the reservoir 14 via line 24. The check valve 40 may allow the flow of fluid from the pump 16 to the RO system 18 and may restrict the flow of fluid from the RO system 18 to the pump 16 via line 26.

In order to provide an energy recovery arrangement, rotary valves 42 and 44 may be included in the line 30 and the drain 36. The rotary valve 42 may allow the flow of discharge fluid from the RO system 18 to the pump 16 via line 30, and the rotary valve 44 may allow the flow of fluid from the pump 16 to the drain line 36.

A motive actuator such as a motor 46 may be provided to drive the piston 34 and the rotary valves 42 and 44. The motor may drive a cam 48 connected to the piston 34 via a drive shaft 50 to drive the piston reciprocatively within the cylinder 32. The shaft 50 may include an enlarged section 52 directly adjacent the piston 34. The enlarged section 52 determines the loss of fluid volume due to the production of the desired product to help provide automatic self regulation of the product. The motor 46 may also be connected to a pair of gearboxes 54 and 56 driving rods or shafts 58 and 60, respectively. Rods 58 and 60 may in turn drive rotary energy recovery valve (ERV) 42 and a rotary fluid discharge valve (FDV) 44. For increased efficiency of the system, the motor may be run at its most efficient maximum velocity.

Referring now to FIGS. 3 and 4, the cam 48 is shown in greater detail. The cam 48 may include a rim 62 along its outer surface so that cam follower rollers 64 and 66 attached to the end of the shaft 50 to hold the shaft 50 to the cam 48. Other methods of holding the shaft to follow the cam may also be utilized, such as a spring (not shown) pushing or urging the shaft against the cam. For a pump having a pump-to-fill ratio of 2:1, the cam 48 may be shaped such that the power stroke of the piston 34 takes twice as long as the return stroke of the piston 34 and that one power stroke and one return stroke occur for each complete revolution of the cam 48. Therefore, two-thirds of a revolution of the cam 48 pushes the piston 34 to the right for a power stroke and one-third of a revolution of the cam 48 pulls the piston 34 to the left for a return stroke as shown in FIG. 2. Other pump-to-fill ratios may be employed.

As best seen in FIG. 4, the movement of the cam 48 may include a bottom dead center (BDC) position 68 corresponding to the piston 34 being at its far left retracted position (FIG. 2) and a top dead center (TDC) position 70 corresponding to the piston 34 being at its far right advanced position (FIG. 2). The cam followers 64 and 66 (FIG. 3) of the cam 48 starting at BDC position 68 and moving to TDC position 70 corresponds to the power stroke of the piston 34. The cam followers 64 and 66 of the cam 48 (FIG. 3) starting at TDC position 70 and moving to the BDC position 68 corresponds to the return stroke of the piston 34. The configuration of the path of movement of the cam followers may be configured to move piston 34 during its power stroke at a rate proportional to $\sin^m x$ for $x=0$ to $\pi$, where m is a number greater than one and x is the angular position of a fixed point on the cam 48. In the presently preferred embodiment of the invention as shown and described in connection with FIGS. 1 through 4, m is equal to two.

A graph of the velocity during the power stroke and the position of the piston for one revolution is shown in FIG. 5. As discussed above the velocity of the piston during the power stroke, indicated as reference number 74 (FIG. 4), may be in this presently preferred example, proportional to $\sin 2x$ for $x=0$ to $\pi$. The position of the piston 34 (FIG. 2) may be proportional to the following equation:

$$\text{position} = \frac{x}{2} - \frac{\sin^2 x}{4}$$

for $x=0$ to $\pi$ during the power stroke and for $x=\pi$ to 0 during the return stroke. As shown in FIG. 4, the position of the piston starts at the BDC position and moves to the TDC for pumping during the power stroke then continues back to the BDC position for filling during the return stroke. For a given cam such as the cam 48, the total time of each pump cycle depends on the rotational velocity of the motor (the time of one revolution of the motor), and more precisely, on the rotational velocity of the cam such as the single cycle cam 48. For example, as shown in FIG. 5, this concept may also be expressed as follows: total time of a pump cycle = time of power stroke + time of return stroke, where time of return stroke =0.5× time of power stroke. During a single pump cycle a gradual transition between the end of the power strike and the beginning of the return stroke will occur without any unwanted and undesirable delay or dwell time.

As hereinafter described in greater detail, there can be multiple pumping cylinders to achieve a constant flow. If the $\sin^2 x$ piston velocity, for the preferred embodiment, for a pumping cylinder is combined with an appropriate number of additional cylinders acting in a phased relationship in parallel, a substantially constant overall flow results. In general, in order to produce a substantially constant output flow, m may be an even integer, and the number of simultaneous pumping cylinders is at least equal to m/2+1, where m is an even number integer. Thus, for example, where m=2, then the piston velocity is $\sin^2 x$, and the number of simultaneous pumping cylinders is equal to 2.

The velocity and acceleration of the flow are zero simultaneously using a piston velocity of $\sin^m x$, where m is greater than one. For higher powers for sin x, the approach is progressively more gradual toward zero, such as for the presently preferred $\sin^2 x$ velocity waveform to cause the piston velocity and the acceleration to gradually approach zero, thereby to provide gentle valve action to help protect the valves such as the energy recovery valve and the check valve, and thus to provide longer valve life with significantly less audible noise and vibration. in this regard, certain embodiments prevent unwanted deceleration of the valve member when it moves to its closed position, and the deceleration is zero at such time. As shown in FIG. 5, this embodiment exhibits a piston velocity toward zero of a very gentle and flat disposition, as compared to, for example, other approaches that employ significantly more violent transitions. When m is selected to be greater than two, such, for example, as $\sin^4 x$ for $x=0$ to $\pi$, similar characteristics may be achieved for certain applications.

Figure 7:
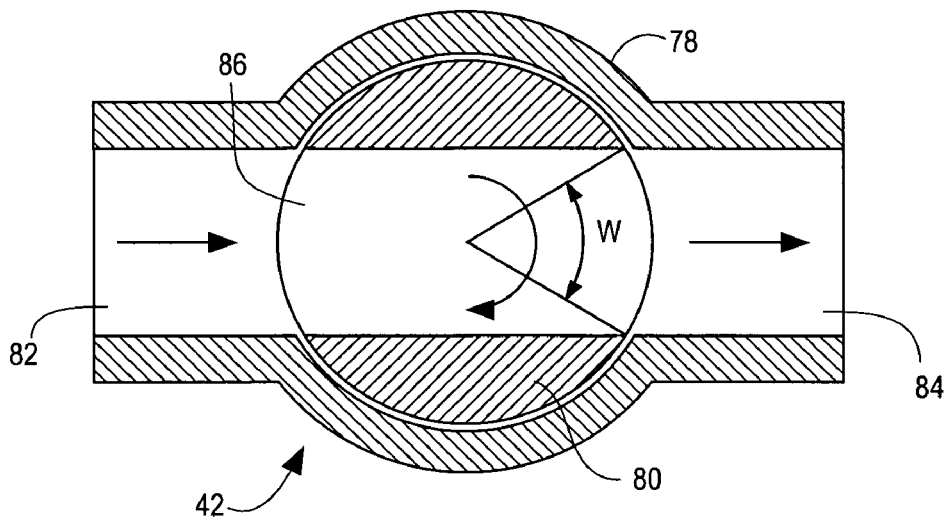
FIG. 7 is a sectional view of a rotary valve of FIG. 2.

Now referring to FIG. 7, the rotary valve 42 is shown in greater detail. The rotary valve 42 may include a valve body 78, and a circular valve member 80. The valve body 78 may include respective inlet and outlet ports 82 and 84 for the input and output of fluids through the rotary valve 42. A rotary valve may be used in this system due to its precision action and durability. Since the rotary valves may be driven at a constant velocity, the valves may encounter little or no accelerations which may improve their durability and reduce maintenance of the system for certain applications.

The valve member 80 may include a passageway 86 selectively communicating with the inlet and outlet ports for opening and closing the rotary valve 42. The size of the passageway angle w (in radians) may be determined by the equation:

$$w = \frac{T_o * \pi}{2},$$

where $T_o$ is the fractional open time for the valve

The fractional open time for the rotary valve 42 may be calculated by dividing the time of the power stroke by the total time. $T_o$ of the above equation for rotary valve 42 equals ⅔. Similarly, the fraction open time for rotary valve 44 may be calculated by dividing the time of the return stroke by the total time. Likewise, the $T_o$ for rotary valve 44 equals ⅓.

In operation, the motor 46 may drive the pump 16 through a power stroke and a return stroke during each revolution of the motor 46 due to the shape of the cam 48. It should be understood that other shapes and configurations of the cam may also be employed. Simultaneously the motor 46 may drive each of the rotary valves 42 and 44 through an alternating open period and a closed period during each one half revolution of the motor 46 due to the symmetry of the rotary valves. The rotary valves transition from varying percentages of total flow, but at no time may both rotary valves be open at the same time.

During a return stroke of the piston 34 with the rotary valve 42 closed and the rotary valve 44 open, fluid in the reservoir 14 may by forced or pulled through the check valve 38 in line 24 into the first volume 33 of the cylinder 32 and fluid in the second volume 35 of the cylinder 32 may be forced out the rotary valve 44 into the drain 36. During a power stroke of the piston 34 with the rotary valve 42 open and the rotary valve 44 closed, fluid in the first volume 33 of the cylinder 32 may be pressurized and forced through the check valve 40 into the RO system 18 and pressurized discharge fluid from the RO system 18 is forced through the rotary valve 42 in line 30 into the second volume 35 of the cylinder 32 pushing on the piston 34 and assisting the motor 46 in moving the piston 34. This method of energy recover may add to the overall efficiency of the system.

Figure 9:
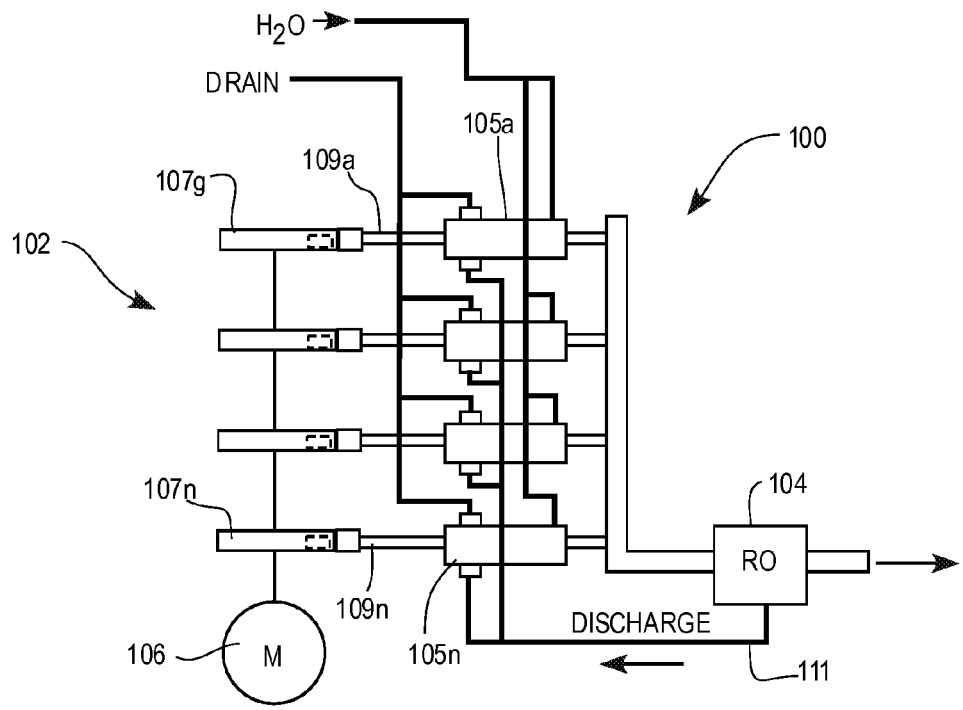
FIG. 9 is a diagram of an embodiment utilizing a pump having a plurality of cylinders with an RO device.

Referring now to FIG. 9, there is shown another pumping system 100, which is similar to the system 10, except the system 100 includes a pump having a plurality of cylinders for providing fluid to an RO system is shown. The pump 102 may include a plurality of cylinders 105a-n receiving fluid such as water to be clarified from a reservoir (not shown) and providing pressurized fluid to an RO system 104. If desired, the RO system may provide a bi-product fluid to the cylinders via line 111 for energy recovery to assist the motor in moving the piston during its power stroke. The pump 102 may include at least three cylinders of which at least two simultaneously pump fluid. Each cylinder functions in a similar manner as the cylinder 32 (FIG. 2) and are operated in a suitable phase relationship. A motor 106 may drive a plurality of cams and cam followers 107a-n which drive a plurality of shafts 109a-n of the cylinders 105a-n, respectively in a similar manner as the cam 48 and cam followers 64 and 66 drive the piston rod or shaft 50 reciprocatively.

Figure 10:
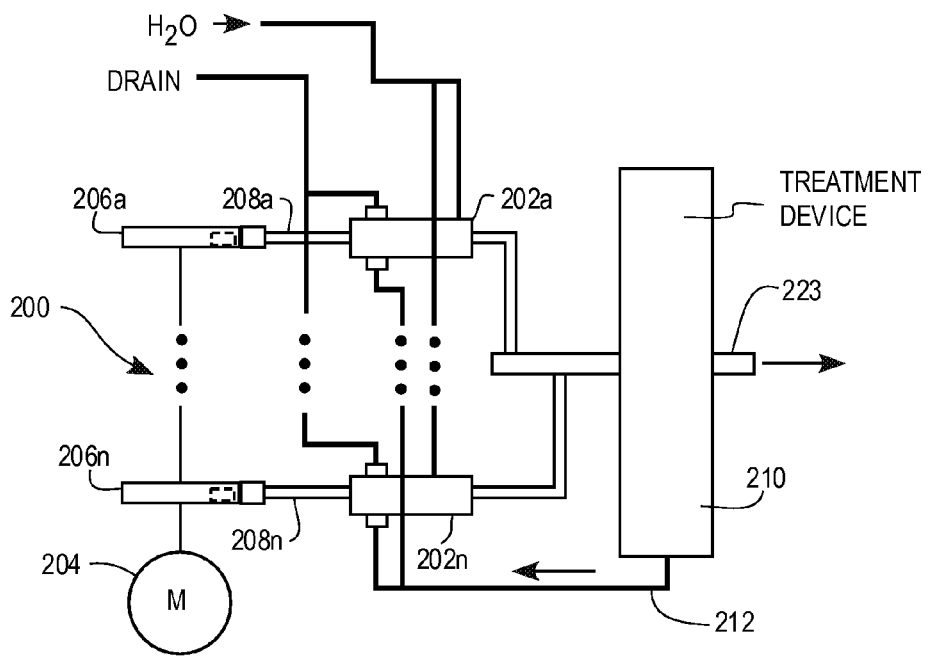
FIG. 10 is a diagram of another embodiment of the present invention utilizing a pump having a plurality of cylinders with a chemical or physical treatment device.

Referring now to FIG. 10, a pump 200 is shown and is constructed according to another embodiment of the invention. The system 200 is a generalized case and includes a plurality of cylinders 202a-n providing a substantially constant fluid flow to a treatment device 210. The treatment device may be a variety of chemical or physical processes or other types and kinds of systems, components or devices. The pump 200 may include the plurality of cylinders 202a-n receiving fluid from a reservoir (not shown) and providing pressurized fluid to the device 210. A motor 204 or other motive actuator (not shown) may drive a plurality of cams 206a-n which drive a plurality of piston shafts or rods 208a-n of the cylinders 202a-n, respectively. The velocity of the pistons (not shown) during their power stroke may be proportional to $\sin^2 x$ for $x=0$ to $\pi$ in a similar manner as the piston 34 of FIG. 2. The pump may pump a variety of fluids at the substantially constant flow to the device 210, such as hydraulic fluid or other liquids or gases. With a substantially constant flow provided by the pump, the audible noise and vibration in typical hydraulic devices may be eliminated or greatly reduced. If desired, the pump 200 may include a pressurized recovery fluid via line 212 from the device 210 when the device or system 210 provides a secondary stream. An output line 223 may be provided, or for some treatment devices, there may not be an output line.

The velocity of the pistons during their power stroke may be proportional to $\sin^2 x$ for $x=0$ to $\pi$ for the present example. The phase offset of the cams depends on the number of simultaneously pumping cylinders. The following table shows the fractional fill times in view of the number of simultaneous cylinders and extra cylinders. The fraction fill time of the cylinder equates to the open time ($T_o$) of the rotary valve connected to the drain and the open time ($T_o$) of the rotary valve connected to discharge of the RO system may be calculated by subtracting the $T_o$ of the rotary valve connected to the drain from one (1). Using these open times the size of the angle w of the passageway of the valve member of each rotary valve may be calculated.

|  | Ns | | | | | | Ne |
| --- | --- | --- | --- | --- | --- | --- | --- |
|  | 2 | 3 | 4 | 5 | 6 | 7 |  |
| Pf | 2/3 | 3/4 | 4/5 | 5/6 | 6/7 | 7/8 | 1 |
| Ff | 1/3 | 1/4 | 1/5 | 1/6 | 1/7 | 1/8 | 1 |
| Phase π | 2/3 | 1/2 | 2/5 | 1/3 | 2/7 | 1/4 | 1 |
| Phase degree | 120 | 90 | 72 | 60 | 51 | 45 | 1 |
| Flow Vc/T | 1.5 | 2.0 | 2.5 | 3.0 | 3.5 | 4.0 | 1 |
| w(ERV) π | 1/3 | 3/8 | 2/5 | 5/12 | 3/7 | 7/16 | 1 |
| w(FDV) π | 1/6 | 1/8 | 1/10 | 1/12 | 1/14 | 1/16 | 1 |
| Pf | 1/2 | 3/5 | 2/3 | 5/7 | 3/4 | 7/9 | 2 |
| Ff | 1/2 | 2/5 | 1/3 | 2/7 | 1/4 | 2/9 | 2 |
| Phase π | 1/2 | 2/5 | 1/3 | 2/7 | 1/4 | 2/9 | 2 |
| Phase degree | 90 | 72 | 60 | 51 | 45 | 40 | 2 |
| Flow Vc/T | 2.0 | 2.5 | 3.0 | 3.5 | 4.0 | 4.5 | 2 |
| w(ERV) π | 1/4 | 3/10 | 1/3 | 5/14 | 3/8 | 7/18 | 2 |
| w(FDV) π | 1/4 | 1/5 | 1/6 | 1/7 | 1/8 | 1/9 | 2 |
| Pf | 2/5 | 1/2 | 4/7 | 5/8 | 2/3 | 7/10 | 3 |
| Ff | 3/5 | 1/2 | 3/7 | 3/8 | 1/3 | 3/10 | 3 |

-continued

| | Ns | | | | | | Ne |
|---|---|---|---|---|---|---|---|
| | 2 | 3 | 4 | 5 | 6 | 7 | |
| Phase $\pi$ | 2/5 | 1/3 | 2/7 | 1/4 | 2/9 | 1/5 | 3 |
| Phase degree | 72 | 60 | 51 | 45 | 40 | 36 | 3 |
| Flow Vc/T | 2.5 | 3.0 | 3.5 | 4.0 | 4.5 | 5.0 | 3 |
| w(ERV) $\pi$ | 1/5 | 1/4 | 2/7 | 5/16 | 1/3 | 7/20 | 3 |
| w(FDV) $\pi$ | 3/10 | 1/4 | 3/14 | 3/16 | 1/6 | 3/20 | 3 |

Pf = pump fraction = Ns/(Ne + Ns)
Ff = fill fraction = Ne/(Ne + Ns)
Phase (radian) = 2$\pi$/N
Phase(radian) = 2$\pi$/(Ns + Ne)
Flow = (Vc/T)(Ne + Ns)/2
w(radian) = To $\pi$/2
where:
Ns = number of simultaneously pumping cylinders
Ne = number of extra cylinders
N = total number of cylinders (Ns + Ne)
Vc = volume of cylinder
T = time of one complete pump fill rotation
$T_o$ = fractional time opened (any flow)
W(radians) = angle of opening of valve
ERV, FDV = energy recovery valve, fluid discharge valve.

In a pump having three cylinders, the cams may be offset by 120° from one another, since a single revolution of the motor moves the pistons in the cylinders through a single pumping cycle each. Since the velocity of the pistons during their power stroke may be proportional to $\sin^2 x$ in the present example, the output flow of the pressurized fluid from each cylinder during each power stroke may also be proportional to $\sin^2 x$.

FIG. 6 shows a graph of the output flows of each of the individual cylinders of a three cylinder system, and the total output flow. Output flow curves from the first, second, and third cylinders correspond to lines 120, 122, and 124, respectively. The individual output flows from the three cylinders may provide a total output flow 130 that is constant due to the shape and offset of the three individual output flow curves. Thus, by employing at least three cylinders, a substantially constant output flow may be provided.

In general, the total combined flow from the pumping cylinders may be expressed for the present example, as follows:

$$\sum_{i=1}^{i=n} \sin^m[x + (i-1)\Phi],$$

where $\Phi$ is the phase shift equal to $\pi/n$, and where n equals the number of simultaneously pumping cylinders and m is a number greater than one.

Figure 8:
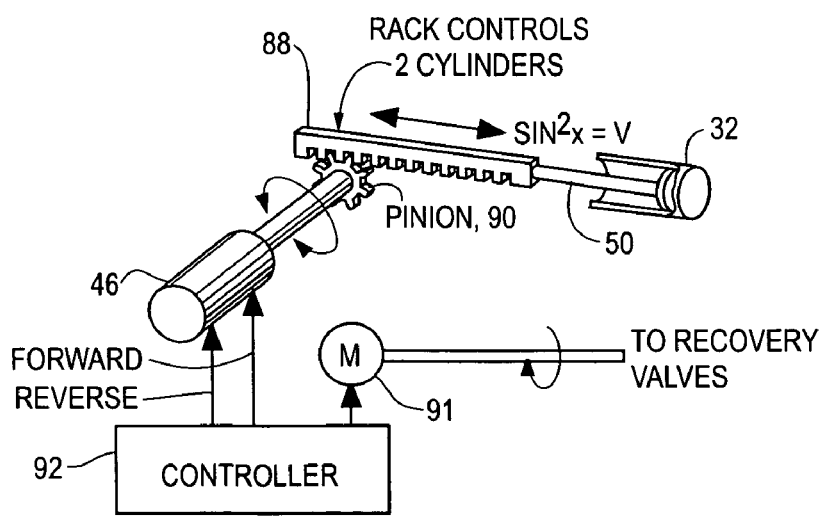
FIG. 8 is a diagrammatic view of an alternative method of connecting the motor to the piston shaft.

As shown in FIG. 5, due to the configuration of the cam such as the cam 48 (FIGS. 2, 3 and 4), the pumping time of certain embodiments of the system may be substantially greater than the fill time to provide an efficient operation. As shown in FIG. 8, the rotary recovery valves such as the valve 42 are coordinated in their opening and closing operation with the power and return strokes of the piston. As mentioned previously, the size of the valve member passage may be adjusted accordingly.

The configuration of the cam may be selected such that the shape of the portion of the cam that determines the fill time, can be any shape or configuration as desired.

Referring now to FIG. 8, an alternate embodiment of the connection assembly between the motor 46 and a piston shaft 50 for the cylinder 32 is shown. In this assembly a rack 88 connected to the shaft 50 and a pinion 90 connected drivingly to a motive actuator including a pump motor 46, replace the cam 48 (FIG. 2) to convert the rotary motion of the motor 46 to the reciprocating motion of the piston shaft 50. A controller 92 may control the motor 46 to change direction and velocity of the pinion 90 to move the shaft 50 at a velocity of $\sin^2 x$ during the power stroke of cylinder. A motive actuator may include a valve motor 91 controlled by the controller 92 to drive the rotary valves in synchronous with the power stroke and return stroke as discussed previously.

While particular embodiments of the present invention have been disclosed, it is to be understood that various different embodiments are possible and are contemplated within the true spirit and scope of the appended claims. There is no intention, therefore, of limitations to the exact abstract or disclosure herein presented.

What is claimed is:

1. A pump for providing fluid to a treatment device, comprising
at least N number of cylinders, where N is an integer greater than 2;
only one piston in each cylinder;
the pistons having a motive actuator means driving at a given velocity;
the pistons each being attached to a rod driven by the motive actuator means;
N number of transmissions each attaching one of the rods to the motive actuator means to drive each rod reciprocatively at a rate of substantially $\sin^m x$ for x=0 to $\pi$ during a power stroke of a respective piston, where m is a number greater than one and x is the angular position of a fixed point on a respective transmission;
the transmissions driving the pistons in an overlapping phase relationship with a phase offset between the power strokes of the pistons to provide individual flow from each cylinder offset in time to in turn provide a substantially constant fluid flow to the treatment device;
the transmissions being coupled to the motive actuator means angularly spaced by $2\pi/N$ to provide the phase offset between the power strokes; and
wherein the total time of a pump cycle equals the time of the power stroke plus the time of a return stroke of the piston without any substantial dwell time.

2. The pump of claim 1 wherein the motive actuator means is a motor and the transmissions are N number of cams attaching the rods to the motor to convert the rotary motion of the motor to the reciprocating motion of the rods and pistons.

3. The pump of claim 1 wherein each cylinder defines a first and second volume, and further including at least one first valve controlling the output of fluid from the first volume of each cylinder.

4. The pump of claim 3, further including at least one second valve controlling the input of fluid into the first volume of each cylinder.

5. The pump of claim 1 wherein the actuator is a motor, and wherein each cylinder defines a first and second volume, the pump further including at least one first valve controlling the flow of fluid into the second volume of the cylinder to assist the motor in moving the piston, and
at least one second valve controlling the flow of fluid out of the second volume of the cylinder, wherein at least one of the first and second valves is a rotary valve.

6. The pump of claim 1 wherein the actuator is a motor, and wherein each cylinder defines a first and second volume, the pump further including at least one first valve controlling the flow of fluid into the second volume of the cylinder to assist the motor in moving the piston, and at least one second valve controlling the flow of fluid out of the second volume of the cylinder, wherein each of the first and second valves is driven by the motor.

7. The pump of claim 1 wherein the actuator is a motor, and wherein each cylinder defines a first and second volume, the pump further including at least one first valve controlling the flow of fluid into the second volume of the cylinder to assist the motor in moving the piston, and
at least one second valve controlling the flow of fluid out of the second volume of the cylinder, wherein each of the first and second valves is driven by a valve motor.

8. The pump of claim 1, wherein the given velocity is the most efficient maximum velocity of the motor.

9. A pumping system for a treatment device, comprising
N number of cylinders, where N is an integer greater than 2;
a piston in each of the cylinders defining a first and second volume in each cylinder;
a motive actuator means driving at a given velocity;
a plurality of rods, each rod attached to one of the pistons and driven by the motive actuator means;
N number of transmissions each attaching one of the rods to the motive actuator means to drive each rod at a rate of substantially $\sin^m x$ for $x=0$ to $\pi$ during a power stroke of a respective piston, where m is a number greater than one and x is the angular position of a fixed point on a respective transmission;
the transmissions driving the pistons in an overlapping phase relationship with a phase offset between the power strokes of the pistons to provide individual flow from each cylinder offset in time to in turn provide a substantially constant fluid flow to the treatment device;
the transmissions being coupled to the motive actuator means angularly spaced by $2\pi/N$ to provide the phase offset between the power strokes;
wherein the total time of a pump cycle of each one of the pistons equals the time of the power stroke plus the time of a return stroke of each piston individually without any substantial dwell time;
wherein the treatment device receives a first fluid under pressure and outputs a second fluid and a third fluid; and
a first and a second valve for each of the cylinders, each first valve controlling the flow of the third fluid into the second volume of the cylinder to assist the motive actuator means in moving the piston, each second valve controlling the flow of the third fluid out of the second volume of the cylinder.

10. The system of claim 9, wherein m is an even integer number.

11. The system of claim 10, wherein the number of cylinders is at least equal to m/2+1.

12. The system of claim 9, wherein the total combined flow from the pumping cylinders is proportional to $$\sum_{i=1}^{i=n} \sin^{m2}[x+(i-1)\Phi],$$

where $\Phi$ is the phase shift equal to $\pi/n$, where the phase shift is the phase shift between n pistons each moving at a rate $\sin^m x$, and where n equals the number of simultaneously pumping cylinders.

13. The system of claim 9, wherein the treatment device is a reverse osmosis device.

14. The system of claim 9 wherein the motive actuator means is a motor, and the transmissions are N number of cams attaching each rod to the motor to convert the rotary motion of the motor to the reciprocating motion of the rods and pistons.

15. The system of claim 9 further including at least one first check valve controlling the output of fluid from the first volume of each of the cylinders.

16. The system of claim 15 further including at least one second check valve controlling the output of fluid into the first volume of each of the cylinders.

17. The system of claim 9, wherein at least one of the first and second valves is a rotary valve.

18. The system of claim 9, wherein the motive actuator means is at least one motor, and wherein each of the first and second valves is driven by the motor running at a substantially constant velocity.

19. The system of claim 9, wherein the motive actuator means includes a valve motor, and wherein each of the first and second valves is driven by the valve motor.

20. The pumping system of claim 9, wherein the given velocity is the most efficient maximum velocity of the motor.

21. A desalination system, comprising
a pretreatment unit;
a reservoir for holding fluid from the pretreatment unit;
a motive actuator means driving at a given velocity;
a pump receiving the fluid from the reservoir and including N number of cylinders having pistons driven by the motive actuator means, where N is an integer greater than 2;
N number of transmissions each attaching one of the pistons to the motive actuator means to drive each piston at a velocity of $\sin^m x$ for $x=0$ to $\pi$ during a power stroke of each piston, where m is a number greater than one and x is the angular position of a fixed point on a respective transmission of each piston,
the transmissions driving the pistons in an overlapping phase relationship with a phase offset between the power strokes of the pistons to provide individual flow from each cylinder offset in time to in turn provide a substantially constant output fluid flow from the pump;
the transmissions being coupled to the motive actuator means angularly spaced by $2\pi/N$ to provide the phase offset between the power strokes;
wherein the total time of a pump cycle of each one of the pistons equals the time of the power stroke plus the time of a return stroke of each piston individually without any substantial dwell time;
a reverse osmosis device receiving the output fluid flow from the pump and generating a desired product and a discharge, the discharge is provided to the pump for energy recovery; and
a post-treatment unit receiving the desired product from the reverse osmosis device and preparing the desired product for distribution.

22. The system of claim 21, wherein m is an even integer number.

23. The system of claim 22, wherein the number of cylinders is at least equal to m/2+1.

24. The system of claim 21, wherein a plurality of check valves control the flow of fluid from the reservoir into the cylinders of the pump and control the output fluid flow from the cylinders of the pump.

25. The system of claim 21, wherein a plurality of valves control the flow of the discharge from the reverse osmosis device into and out of the pump.

26. The system of claim 25, wherein at least one of the valves is a rotary valve.

27. The system of claim 25, wherein the motive actuator means is at least one motor, and wherein the valves are controlled by the motor running at a substantially constant velocity.

28. The system of claim 25, wherein the motive actuator means includes a valve motor, and wherein the valves are controlled by the valve motor.

29. The system of claim 21, wherein the motive actuator means is a motor, and wherein the transmissions include N number of cams driven by the motor to convert the rotary motion of the motor to the reciprocating motion of the pistons.

30. The desalination system of claim 21, wherein the given velocity is the most efficient maximum velocity of the motor.

31. A method of pumping a fluid with a pump having N number of cylinders, where N is an integer greater than 2, each cylinder having a piston reciprocatively mounted therein and driven by N number of transmissions that are driven by a motive actuator means, comprising
coupling the transmissions to the motive actuator means angularly spaced by $2\pi/N$ to provide a phase offset between the power strokes of the pistons;
driving the motive actuator means at a given velocity;
driving the each piston at a velocity proportional to $\sin^m x$ for $x = 0$ to $\pi$ during a respective power stroke, where m is a number greater than one, and x is the position of a fixed point on a respective transmission;
driving the pistons in an overlapping phase relationship with the phase offset between the power strokes of the pistons to provide individual flow from each cylinder to in turn provide a substantially constant output fluid flow; and
wherein the total time of a pump cycle equals the time of the power stroke plus the time of a return stroke of the piston without any substantial dwell time.

32. A method of claim 31, wherein the output fluid flow from the pumping cylinders is proportional to the sum from $i=1$ to n of $\sin^m[x+(i-1)\Phi]$, where $\Phi$ is the phase shift equal to $\pi/n$, where the phase shift is the phase shift between n pistons each moving at a rate $\sin^m x$, and where n equals the number of simultaneously pumping cylinders.

33. The method of claim 31, wherein the given velocity is the most efficient maximum velocity of the motor.

34. A method of processing a fluid using a pump having N number of cylinders, where N is a integer greater than 2, a piston in each cylinder driven by one of N number of transmissions that are driven by a motive actuator means, and a treatment device outputting a desired product and a discharge fluid, comprising
coupling the transmissions to the motive actuator means angularly spaced by $2\pi/N$ to provide a phase offset between the power strokes of the pistons;
driving the motive actuator means at a given velocity;
driving each piston at a velocity proportional to $\sin^m x$ during a power stroke of each piston, where m is a number greater than one and x is the position of a fixed point a respective transmission, during its power stroke;
driving the pistons in an overlapping phase relationship with the phase offset between the power strokes of the pistons to provide individual flow from each cylinder to in turn provide a substantially constant fluid flow to the treatment device;
wherein the total time of a pump cycle of each one of the pistons equals the time of the power stroke plus the time of a return stroke of each of the pistons individually without any substantial dwell time;
providing the discharge fluid to the pump for energy assistance; and
driving a pair of rotary valves for each cylinder to control the flow of the discharge fluid into and out of the pump.

35. The method of claim 34, further including driving the pistons and rotary valves by the same motor.

36. The method of claim 34, wherein the given velocity is the most efficient maximum velocity of the motor.

37. A method of desalinating a fluid using a pump having N number of cylinders, where N is an integer greater than 2, a piston in each cylinder driven by one of N number of transmissions that are driven by a motive actuator means, and a reverse osmosis (RO) device outputting a desired product and a discharge fluid, comprising
pretreating the fluid to remove solids and prevent salt precipitation and bacterial growth from occurring in the RO device;
holding the pretreated fluid in a reservoir;
providing the pretreated fluid from the reservoir to the pump;
coupling the transmissions to the motive actuator means angularly spaced by $2\pi/N$ to provide a phase offset between the power strokes of the pistons;
driving the motive actuator means at a given velocity;
driving each piston at a velocity proportional to $\sin^m x$ during a power stroke of each piston, where m is a number greater than one and x is the position of a fixed point a respective transmission, during its power stroke;
driving the pistons in an overlapping phase relationship with the phase offset between the power strokes of the pistons to provide individual flow from each cylinder to in turn provide a substantially constant fluid flow to the RO device;
wherein the total time of a pump cycle of each one of the pistons equals the time of the power stroke plus the time of a return stroke of each of the pistons individually without any substantial dwell time;
providing the discharge fluid from the RO device to the pump for energy assistance;
driving a pair of rotary valves for each cylinder to control the flow of the discharge fluid into and out of the pump; and
post-treating the desired product in preparation for distribution.

38. The method of claim 37, wherein the given velocity is the most efficient maximum velocity of the motor.

* * * * *